United States Patent [19]

Ho

[11] Patent Number: 4,794,143
[45] Date of Patent: Dec. 27, 1988

[54] POLYMER COMPOSITION CONTAINING CPE AND STYRENE POLYMER

[75] Inventor: Kam W. Ho, Sarnia, Canada

[73] Assignee: Polysar Limited, Sarnia, Canada

[21] Appl. No.: 172,384

[22] Filed: Mar. 24, 1988

[51] Int. Cl.⁴ .............. C08L 23/26; C08L 23/28; C08K 3/16; C08K 3/10

[52] U.S. Cl. .................... 525/196; 525/87; 525/192; 525/240; 524/528; 524/504

[58] Field of Search .............. 525/196, 192, 87

[56] References Cited

U.S. PATENT DOCUMENTS

| | | | |
|---|---|---|---|
| 3,644,579 | 2/1972 | Nakajima et al. | 260/876 R |
| 3,658,950 | 4/1972 | Eusebi | 260/897 |
| 4,341,885 | 7/1982 | Schepers | 525/211 |
| 4,424,309 | 1/1984 | Schepers | 525/211 |

FOREIGN PATENT DOCUMENTS

| | | | |
|---|---|---|---|
| 2548088 | 5/1976 | Fed. Rep. of Germany | 525/196 |
| 7022009 | 7/1970 | Japan | 525/196 |
| 574044582 | 11/1974 | Japan | 525/196 |

*Primary Examiner*—Carman J. Seccuro
*Attorney, Agent, or Firm*—Stevens, Davis, Miller & Mosher

[57] ABSTRACT

This invention relates to a process to prepare impact resistant blends of chlorinated polyethylene and a styrenic polymer.

8 Claims, No Drawings

POLYMER COMPOSITION CONTAINING CPE AND STYRENE POLYMER

FIELD OF INVENTION

This invention relates to a process to prepare impact resistant polymer compounds containing a styrenic polymer and chlorinated polyethylene. The compounds are prepared in the presence of a Lewis acid and exhibit surprising impact strength. The process of the present invention is completed in standard polymer mixing equipment.

BACKGROUND OF THE INVENTION

Various compounds containing chlorinated polyethylene and styrenic polymers have previously been investigated.

For example, U.S. Pat. No. 4,341,885, to Schepers, discloses an impact resistant composition which contains styrene-acrylonitrile, an unsaturated rubber and chlorinated polyethylene.

U.S. Pat. No. 4,424,309, also to Schepers, discloses a composition which contains styrene-acrylonitrile resin, a saturated rubber, chlorinated polyethylene and PVC.

U.S. Pat. No. 3,658,950 discloses simple blends of styrene acrylonitrile resins and chlorinated polyethylene.

However, the prior art does not disclose the use of a Lewis acid to prepare impact resistant compositions containing a styrenic polymer and chlorinated polyethylene.

SUMMARY OF THE INVENTION

It is one object of the present invention to provide a process to prepare an impact resistant polymer compound containing chlorinated polyethylene and a styrenic polymer.

Accordingly, in one aspect of the present invention there is provided a process to prepare an impact resistant polymer compound consisting of thoroughly admixing in a polymer mixer a composition comprising:
 (i) 25 to 90 parts by weight styrenic polymer, and correspondingly
 (ii) 0.1 to 4.0 parts by weight, per 100 parts combined weight of said styrenic polymer and said chlorinated polyethylene, of a Lewis acid selected from $AlCl_3$, $FeCl_3$ and $SbCl_3$.

In another aspect, the present invention relates to compounds prepared by the process defined directly above.

DETAILED DESCRIPTION

The compounds of the present invention contain a styrenic polymer. The term "styrenic polymer" as used herein refers to:
 (i) polystyrene (the well known, crystalline homopolymer of styrene),
 (ii) poly (p-methyl styrene),
 (iii) copolymers of styrene with a minor amount of a copolymerizable monomer such as acrylonitrile, acrylic acid, methacrylic acid, maleic acid, alkyl substituted vinyl aromatic monomers such as p-methyl styrene, and ring substituted halo-styrenes such as o-chlorostyrene; and
 (iv) "high impact polystyrene" (a generic term referring to styrene polymers which are modified with a minor amount of rubber).

Commercially available styrenic polymers, especially polystyrene, styrene-acrylonitrile resin and high impact polystyrene can be advantageously employed. A blend of more than one styrenic polymer may be used.

The chlorinated polyethylene which is used in the process of the present invention may be prepared by a solution or gas-phase chlorination processes. It is preferred to utilize a chlorinated polyethylene having a chlorine content between 15 and 50 weight percent, most preferably beyween 20 and 40 weight percent. Such chlorinated polyethylenes are commercially available. A mixture of more than one chlorinated polyethylene may be employed in the preparation of the composition.

The amount of chlorinated polyethylene employed is between 10 and 75 parts by weight (with the balance to 100 parts by weight being styrenic polymer). If less than 10 weight percent chlorinated polyethylene is used, the surprising impact strength is not consistently demonstrated.

It is essential that the compounds of the present invention are prepared with a Lewis acid selected from $FeCl_3$, $AlCl_3$ and $SbCl_3$. In the absence of the selected Lewis acid, the surprising impact strength of the inventive compounds is not obtained. The amount of Lewis acid used is between 0.1 to 4.0 parts by weight per 100 parts by weight of polymer (i.e. chlorinated polyethylene weight plus styrenic polymer weight).

While not wishing to be bound by any theories, it is believed that the chlorinated polyethylene and styrenic polymer are grafted together, in the presence of the Lewis acid, as illustrated below:

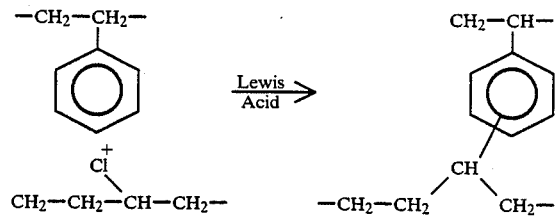

Hydrogen chloride is generated by the above theoretical reaction. Accordingly, it is highly preferred to include an acid acceptor such as calcium stearate, zinc stearate, or epoxidized soya bean oil, in the compositions. The acid acceptor is most preferably added after the Lewis acid.

Other additives which are conventionally included in polymer compounds, for example fillers, lubricants, stabilizers and antioxidants may also be present in the process of the invention. These additives are preferably added after the Lewis acid.

The compounds of the present invention are prepared by thoroughly mixing all ingredients in a standard polymer mixer, such as a mill mixer, an internal mixer, or an extruder.

Temperature and shear rate are important mixing parameters, as known to persons skilled in the art of polymer mixing.

It is preferred to first add the styrenic polymer and masticate until molten, followed by the addition of the chlorinated polyethylene and the Lewis acid. Mixing is preferably continued for 3 to 8 minutes after the addition of the Lewis acid. A mixing temperature of between 140° and 180° C. has been found to be particularly suitable. The mixing temperature should be kept below about 220° C., since chlorinated polyethylene is known to decompose and emit chlorine when exposed to high temperatures.

The optimum mixing temperature will vary according to the shear provided by the mixing equipment employed, in a manner similar to that observed when preparing conventional polymer blends. Thus, a mixer which provides high shear may be operated at a lower temperature than a mixer which provides low shear.

It will be clear to persons skilled in the art that the process of this invention provides a particularly aadvantageous method to prepare impact resistant compounds. That is, most conventional grafting processes requires either a copolymerization step, or the use of a solvent to dissolve the polymeric reactants. In contrast, the present process may be completed in standard polymer mixing equipment, in the absence of a solvent, using commercially available polymers.

The invention is further illustrated by the flllowing, non-limiting examples.

EXAMPLE 1

The compositions shown in Table 1 were prepared in the manner described below. The polystyrene was mixed in a brabender mixer at about 150° C., until molten (about 1 minute). The chlorinated polyethylene was added and mixing was continued for another 2 to 3 minutes. Finally, the Lewis acid was added, and all components were mixed for a further 3 to 5 minutes. The resulting compositions were then molded, and tested for notched Izod impact strength (ASTM D 256). The inventive compounds of experiments 2, 3 and 4 have superior impact strength in comparison to the impact strength of control experiment 1, which was prepared without a Lewis acid.

TABLE 1

| Experiment | PS$^a$ (g) | CPE$^b$ (g) | FeCl$_3$ (g) | AlCl$_3$ (g) | Notched Izod Impact (ft. lb./in.) |
| --- | --- | --- | --- | --- | --- |
| 1(control) | 49 | 27 | — | — | 0.40 |
| 2 | 49 | 27 | 0.4 | — | 0.64 |
| 3 | 49 | 27 | 0.2 | — | 1.36 |
| 4 | 54 | 31 | — | 0.2 | 0.69 |

$^a$polystyrene
$^b$chlorinated polyethylene

EXAMPLE 2

The procedure described in Example 1 was repeated using the compositions shown in Table 2. Again, the improved impact strength of the inventive compounds is evident.

TABLE 2

| Experiment | PS (g) | CPE (g) | FeCl$_3$ (g) | AlCl$_3$ (g) | Notched Izod Impact (ft. lb./in.) |
| --- | --- | --- | --- | --- | --- |
| 20(control) | 42.5 | 42.5 | — | — | 1.47 |
| 21 | 42.5 | 42.5 | — | 0.2 | 1.97 |
| 22 | 42.5 | 42.5 | 0.2 | — | 2.49 |
| 23(control) | 73 | 12 | — | — | 0.19 |
| 24 | 73 | 12 | — | 0.2 | 0.23 |
| 25 | 73 | 12 | 0.2 | — | 0.36 |

EXAMPLE 3

This example illustrates the use of styrene-acrylonitrile resin as the styrenic polymer. The compositions shown in Table 3 were prepared according to procedure generally described in Example 1, but the mixing temperature was about 170° C. Again, the superior impact strength of the inventive compounds is claarly evident.

TABLE 3

| Experiment | San$^c$ (g) | CPE (g) | FeCl$_3$ (g) | AlCl$_3$ (g) | Notched Izod Impact (ft. lb./in.) |
| --- | --- | --- | --- | --- | --- |
| 30(control) | 70 | 11 | — | — | 0.47 |
| 31 | 70 | 11 | — | 0.2 | 0.58 |
| 32 | 70 | 11 | 0.2 | 0 | 0.52 |
| 33(control) | 59 | 27 | — | — | 0.96 |
| 34 | 59 | 27 | — | 0.2 | 1.32 |
| 35 | 59 | 27 | 0.2 | — | 1.90 |
| 36 | 59 | 27 | 0.4 | — | 1.10 |

$^c$styrene-acrylonitrile resin

EXAMPLE 4 (comparative)

Using the procedure as generally described in Example 1, compounds were prepared with polystyrene and each of (i) a chlorinated isobutylene-isoprene rubber having a chlorine content of about 1.2 weight percent ("chlorobutyl rubber"); (ii) poly(choroprene), sold under the name NEOPRENE WH ® 100 by DuPont; (iii) chlorosulfonated polyethylene; and (iv) a poly(epichlorohyrin) sold under the name HYDRIN ® 100 by B. F. Goodrich.

Experiments were completed with and without a Lewis acid (AlCl$_3$ or FeCl$_3$), The use of the Lewis acid did not improve the impact strength of any of the above comparative compounds.

EXAMPLE 5

This example illustrates that reproducibility of the impact strength improvement which is characteristic of the present invention.

A Haake Rheomixer was employed to prepare all compounds, using a rotor speed of 60 rpm and a temperature of 150° C.

The chlorinated polyethylene used in all experiments was a product sold by the Dow Chemical Company under the name TYRIN ® CM0136, which is reported to have a chlorine content of about 36 weight percent and a Mooney viscosity (ASTM D-1646, at 121° C.) of 80.

The polystyrene used in experiments 50-61 was a crystalline homopolymer with an average Mw of about 260,000 and a polydispersity of about 2.1.

The polystyrene used in experiments 62-74 was a crystalline homopolymer having an average Mw of about 257,000 and a polydispersity of about 1.8.

As in the previous examples, the polystyrene was added to the mixer first, followed by the chlorinated polyethylene, with the Lewis acid being added last (if employed). However, in the experiments of this example, the entire compound was physically removed from the mixer (after all ingredients had been mixed once), then put back into the mixer and re-mixed for 2 minutes.

When Lewis acid was used, the amount was 0.4 weight percent (basis: combined weight of PS plus CPE).

As shown in Table 4, the compounds of inventive experiments 51 to 61 and 63 to 74 show surprising impact strength.

TABLE 4

| Experiment | PS (g) | CPE (g) | Lewis Acid (type) | Notched Izod Impact (ft. lb./in.) |
| --- | --- | --- | --- | --- |
| 50(control) | 36.7 | 18.3 | — | 0.40 |
| 51 | 36.7 | 18.3 | FeCl$_3$ | 0.98 |

TABLE 4-continued

| Experiment | PS (g) | CPE (g) | Lewis Acid (type) | Notched Izod Impact (ft. lb./in.) |
|---|---|---|---|---|
| 52 | 36.7 | 18.3 | FeCl$_3$ | 0.97 |
| 53 | 36.7 | 18.3 | FeCl$_3$ | 1.29 |
| 54 | 36.7 | 18.3 | FeCl$_3$ | 1.01 |
| 55 | 36.7 | 18.3 | FeCl$_3$ | 0.82 |
| 56 | 36.7 | 18.3 | FeCl$_3$ | 0.88 |
| 57 | 34.5 | 17.2 | AlCl$_3$ | 0.94 |
| 58 | 34.5 | 17.2 | AlCl$_3$ | 0.93 |
| 59 | 34.5 | 17.2 | AlCl$_3$ | 0.84 |
| 60 | 34.5 | 17.2 | AlCl$_3$ | 1.10 |
| 61 | 34.5 | 17.2 | AlCl$_3$ | 0.93 |
| 62(control) | 36.7 | 18.3 | — | 0.63 |
| 63 | 36.7 | 18.3 | FeCl$_3$ | 0.80 |
| 64 | 36.7 | 18.3 | FeCl$_3$ | 0.97 |
| 65 | 36.7 | 18.3 | FeCl$_3$ | 0.88 |
| 66 | 36.7 | 18.3 | FeCl$_3$ | 0.86 |
| 67 | 36.7 | 18.3 | FeCl$_3$ | 0.78 |
| 68 | 36.7 | 18.3 | FeCl$_3$ | 0.73 |
| 69 | 34.5 | 17.2 | AlCl$_3$ | 1.16 |
| 70 | 34.5 | 17.2 | AlCl$_3$ | 1.14 |
| 71 | 34.5 | 17.2 | AlCl$_3$ | 1.45 |
| 72 | 34.5 | 17.2 | AlCl$_3$ | 1.20 |
| 73 | 34.5 | 17.2 | AlCl$_3$ | 1.35 |
| 74 | 34.5 | 17.2 | AlCl$_3$ | 1.53 |

EXAMPLE 6

This example illustrates the flame resistance of the inventive compounds.

A compound containing chlorinated polyethylene and polystyrene (weight ratio 2:1) was prepared with 0.4 weight percent FeCl$_3$) according to the procedure generally described in example 1. The resulting compound was mixed with 8 weight percent antimony oxide and tested for flammability according to the procedure defined by Underwriter's Laboratory text 94-V. The compound did not ignite during the first flame application, whereas a compound prepared with high impact polystyrene and 8 parts antimony oxide ignited and burned completely.

What is claimed is:

1. A process to prepare an impact resistant polymer compound consisting of thoroughly admixing in a polymer mixer a composition comprising:
   (i) 25 to 90 parts by weight styrenic polymer, and correspondingly
   (ii) 7 to 10 parts by weight chlorinated polyethylene, with
   (iii) 0.1 to 4.0 parts by weight, per 100 parts combined weight of said styrenic polymer and said chlorinated polyethylene, of a Lewis acid selected form AlCl$_3$, FeCl$_3$ and SbCl$_3$.

2. The process of claim 1 wherein said styrenic polymer is polystyrene.

3. The process of claim 1 wherein said admixing is completed at a temperature between 140° C. and 180° C.

4. The process of claim 1 wherein said chlorinated polyethylene contains from 20 to 40 weight percent chlorine.

5. The process of claim 1 wherein said composition further comprises fillers, antioxidant, stabilizer and lubricant.

6. The process of claim 3 wherein said composition comprises:
   (i) 70 to 60 parts by weight styrenic polymer, and correspondingly
   (ii) 30 to 40 parts by weight chlorinated polyethylene,
   (iii) 0.2 to 0.4 parts by weight, per 100 parts combined weight of said styrenic polymer and said chlorinated polyethylene, of a Lewis acid selected from AlCl$_3$, FeCl$_3$ and SbI$_3$.

7. The process of claim 6 wherein said styrenic polymer is polystyrene.

8. The compound prepared by the process of claim 1.

* * * * *

UNITED STATES PATENT AND TRADEMARK OFFICE
CERTIFICATE OF CORRECTION

PATENT NO. : 4,794,143
DATED : December 27, 1988
INVENTOR(S) : Kam W. Ho

It is certified that error appears in the above-identified patent and that said Letters Patent is hereby corrected as shown below:

Column 6, line 9, "7" should be --75--.

Signed and Sealed this

Sixth Day of June, 1989

Attest:

DONALD J. QUIGG

Attesting Officer

Commissioner of Patents and Trademarks